United States Patent
Bergmann et al.

(10) Patent No.: US 6,775,598 B2
(45) Date of Patent: Aug. 10, 2004

(54) METHOD AND DEVICE FOR PRODUCING A DISPLAY AND CONTROL ENVIRONMENT OF A HUMAN/MACHINE INTERFACE

(75) Inventors: Carsten Bergmann, Campbell, CA (US); Andre Oberschachtsiek, Gifhorn (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/214,604

(22) Filed: Aug. 8, 2002

(65) Prior Publication Data

US 2004/0030460 A1 Feb. 12, 2004

(51) Int. Cl.$^7$ .......................... B60K 37/00; G06F 17/00
(52) U.S. Cl. .............................. 701/1; 701/36; 345/717
(58) Field of Search ...................... 701/1, 36; 704/203; 700/83; 345/717, 718, 771, 866

(56) References Cited

U.S. PATENT DOCUMENTS

| | | | | |
|---|---|---|---|---|
| 6,064,721 A | * | 5/2000 | Mohammadian et al. | 379/21 |
| 6,185,491 B1 | * | 2/2001 | Gray et al. | 701/36 |
| 6,236,909 B1 | * | 5/2001 | Colson et al. | 701/1 |
| 6,253,122 B1 | * | 6/2001 | Razavi et al. | 701/1 |
| 6,377,860 B1 | * | 4/2002 | Gray et al. | 700/83 |
| 6,556,219 B1 | * | 4/2003 | Wugofski | 345/762 |
| 6,559,773 B1 | * | 5/2003 | Berry | 340/815.4 |
| 2002/0138178 A1 | | 9/2002 | Bergmann et al. | |

FOREIGN PATENT DOCUMENTS

| | | |
|---|---|---|
| EP | 0 701 826 | 3/1996 |
| WO | WO 01/00452 | 1/2001 |

* cited by examiner

Primary Examiner—Michael J. Zanelli
(74) Attorney, Agent, or Firm—Kenyon & Kenyon

(57) ABSTRACT

A method is for producing a display and control environment of a human-machine interface having connected devices and/or applications, the human-machine interface having directly or indirectly assigned to it a processing unit. A device is for producing a display and control environment of a human-machine interface corresponding to connected devices and/or applications, the human-machine interface including at least one input device and at least one output device, and includes a processing device and/or is connected to a processing device. Stored generic data of the display and/or control environment of the human-machine interface are retrieved and/or transmitted automatically to the processing unit as a function of defined parameters. Furthermore, stored data, e.g., functional data, of the connected devices and/or applications are retrieved or transmitted. In one further step, the retrieved or transmitted data are linked in the processing unit, and, in dependence upon the linkage, display and/or control structures are generated on the human-machine interface.

36 Claims, 2 Drawing Sheets

METHOD AND DEVICE FOR PRODUCING A DISPLAY AND CONTROL ENVIRONMENT OF A HUMAN/MACHINE INTERFACE

CROSS-REFERENCE TO RELATED APPLICATIONS

The present application is related to U.S. patent Application Ser. No. 09/814,233, filed on Mar. 21, 2001, which is expressly incorporated herein in its entirety by reference thereto.

FIELD OF THE INVENTION

The present invention relates to a method for producing a display and control environment of a human-machine interface having connected devices and/or applications, the human-machine interface having assigned to it directly or indirectly a processing unit, a device for producing a display and control environment of a human-machine interface of correspondingly connected devices and/or applications; the human-machine interface having at least one input device and at least one output device and including a processing unit and/or is connected to a processing unit, as well as a computer program product.

BACKGROUND INFORMATION

Devices and methods for human-machine interfaces are used quite generally in numerous devices and applications, including automotive applications. Up to now, these devices and methods have been based on a hard-programmed display which is connected directly and inseparably to the application programs. Such a human-machine interface for use in a motor vehicle is described, for example, in European Published Patent Application No. 0 701 826.

Furthermore, a vehicle communications system having a display and an control unit is described in International Published Patent Application No. WO 01/00452, in which a graphic user interface based on HTML/XML page format is implemented, for which standardized HTML modules, XML modules and ActiveX modules are used as basic modules. The implemented graphic user interface includes an MMI application module in the form of an HTTP server which is generated via an assigned file system HTML page or XML page and which can be implemented in the control computer or in the display and control unit or distributed in both components, as well as an assigned browser or interpreter in the display and control unit for the representation of these generated pages. The system works without a standardized operating system.

It is an object of the present invention to provide a method and a device for producing a display and an control environment of a largely universally usable dynamic human-machine interface.

SUMMARY

The above and other beneficial objects of the present invention are achieved by providing a method and device as described herein.

According to one example embodiment of the present invention, the method for producing a display and control environment of a human-machine interface includes the following steps: retrieving stored generic data of the display and/or control environment of the human-machine interface by the processing unit and or the automatic transmission of the data to the processing unit as a function of certain parameters; retrieving the stored data, e.g., of functional data, of the connected devices and/or applications by the processing unit and/or automatically transmitting the data to the processing unit; and linking the retrieved and/or transmitted generic data of the display and/or control environment of the human-machine interface to the retrieved and/or transmitted data of the connected devices and/or applications in the processing unit, and generating display and/or control structures on the human-machine interface as a function of the linkage.

According to an example embodiment of the present invention, the generic data of the display and/or control environment of the human-machine interface have environment-specific and/or device-specific and/or customer-specific data, as well as, separately from this, functional and/or functional group-dependent data of connectible devices. The environment-specific and/or device-specific and/or customer-specific data may include, for example, data of the designated place of use, for example, the data may be distinguishable depending on whether the human-machine interface in the vehicle is being used for a business or a private purpose. Such data include, for example, design and color data of the displays or their components. The functional and/or functional group-dependent data include, for example, data of the structural design of display images and/or their components, data of the menu structure or the linkage of the displays.

According to an example embodiment of the present invention, the environment-specific and/or device-specific and/or customer-specific data are put together with the retrieved data of the functional and/or functional group-dependent data as a function of predefined parameters, which at least determine which of the stored data of the one and/or the other group are retrieved or transmitted.

Another example embodiment of the method according to the present invention provides that, in a first step, functional and/or functional group-dependent data are retrieved and/or automatically transmitted. Thereafter, in a further step, environment-specific and/or device-specific and/or customer-specific data are automatically retrieved and/or transmitted corresponding to the retrieved and/or transmitted functional and/or functional group-dependent data and/or as a function of predefined parameters. In addition, the data of the connected devices and/or applications are automatically retrieved and/or transmitted. The retrieved and/or transmitted data are linked together and displays and/or control structures are produced on the human-machine interface, with the aid of the retrieved and/or transmitted data.

In the case of use of the human-machine interface in a motor vehicle, according to an example embodiment of the present invention, the environment-specific and/or device-specific and/or customer-specific data include vehicle-specific data, e.g., on the manufacturer and/or the vehicle type and/or data on the vehicle appointments, etc. It may further be provided that the functional and/or functional group-dependent data have data on appearance and/or at least one function of at least one program-controlled representation, e.g., of an applet, for each of several vehicles.

The data of the connected devices and/or applications may contain data on functions of the connected devices and/or applications, e.g., at least one function corresponding to one program-controlled display.

According to an example embodiment of the present invention for the use in a motor vehicle, the following method steps are provided: retrieving and/or automatically transmitting the data which represent the appearance and/or the function of at least one program-controlled display, e.g., of an applet; retrieving and/or automatically transmitting at least vehicle-specific parameters of environment-specific data corresponding to the retrieved data of the at least one program-controlled display and/or retrieval and/or transmission of the vehicle-specific parameters as a function of certain predefinitions or parameters; retrieving and/or automatically transmitting the functional data of the connected devices and/or applications corresponding to the retrieved data of the at least one program-controlled display; and generating displays and/or control structures on the human-machine interface having at least one program-controlled display corresponding to the retrieved and/or transmitted data linked with one another.

In addition, at least a part of the data, e.g., functional data of the devices and/or applications to be displayed and/or controlled, may be stored in a central device of a data communications network, for example, the Internet or intranets, and are retrieved and/or automatically transmitted by the processing unit via a communications connection that is able to be established.

A further example embodiment of the present invention provides that at least one part of the generic data of the display and/or control environment of the human-machine interface and/or additional data of the display and/or control environment are stored in a central device of a data communications network and are retrieved and/or automatically transmitted by the processing device via a communications connection that is able to be established.

According to an example embodiment of the present invention, the stored data of the display and/or control environment and/or the stored data of the devices and/or applications to be displayed and/or controlled, are updated at defined time periods and/or in dependence upon events, and are retrieved and/or automatically transmitted at defined time periods and/or in dependence upon events. In the case of application in a vehicle, such events may include items such as "ignition on/off", "new device and/or application being connected to human-machine interface", "manual request for stored data", "new data available" and/or "vehicle in service". However, the foregoing is not intended to limit the scope of the present invention. Other events are also possible.

In an example embodiment of a device according to the present invention, the processing device has assigned to it one or more storage devices in which generic data of the display and/or control environment of the human-machine interface and data, e.g., functional data of the connected devices and/or applications are stored. According to the present invention, the processing device is configured so that the stored generic data of the display and/or control environment as a function of certain parameters or predefined items of whatever kind, and stored data of the connected devices and/or applications, are retrievable and/or are retrieved, and/or are transmissible and/or are transmitted, and the retrieved and/or transmitted generic data of the display and/or control environment are linkable and/or linked to the retrieved and/or transmitted data of the connected devices and/or applications. Furthermore, the processing device is configured so that display or control structures are able to be generated and/or are generated on the human-machine interface in dependence upon the linkage having occurred.

Generic data are to be understood to include such data as relate not to a special connected device and/or application and their functions, but relate to the functionality and the appearance of the displays of the display and control structures.

According to one example embodiment of the device according to the present invention, the generic data are subdivided into two groups. On the one hand, these include environment-specific and/or device-specific and/or customer-specific data, and on the other hand, they include functional and functional group-dependent data of the displays, as well as of the display and control structure. In this regard, the processing unit is configured so that retrieved and/or transmitted data of the environment-specific, device-specific and customer-specific data and retrieved and/or transmitted data of the functional and/or functional group-dependent data are able to be brought together and/or are brought together in the processing device.

An example embodiment of the device according to the present invention provides that the processing unit is configured so that data of the functional and/or functional group-dependent data are retrievable and/or are retrieved and/or are automatically transmissible and/or are transmitted, data of the environment-specific and/or device-specific and/or customer-specific data are retrievable and/or are retrieved and/or are transmissible and/or are transmitted corresponding to the retrieved and/or transmitted functional and functional group-specific data and/or as a function of certain parameters or predefined values as well as data of the connected devices and/or applications. The processing unit is further configured so that the retrieved and/or transmitted data are able to be linked with one another and/or are linked, and in dependence upon the linkage, display and/or control structures of the human-machine interface are able to be generated and/or are generated.

If the environment-specific and/or device-specific and/or customer-specific data have vehicle-specific data, and the functional and/or functional group-specific data have data corresponding to appearance and/or at least one function of at least one program-controlled display, e.g., of an applet, for each of several vehicles, vehicle types and/or vehicle equipment, and the function data of the connected devices and/or applications correspond to the functions of the connected devices and/or applications, at least one function corresponding to a program-controlled display, then the processing unit may be configured so that the data, which represent the construction and/or the function of at least one program-controlled display, are retrievable and/or are retrieved and/or are automatically transmissible and/or are transmitted, and at least the vehicle-specific parameters or data of the environment-specific, device-specific and/or customer-specific data are retrievable and/or are retrieved and/or are transmissible and/or are transmitted corresponding to the data of the at least one program-controlled display and/or in dependence upon defined parameters and predefined values. In addition, the data, e.g., the functional data, of the connected devices and/or applications corresponding to the at least one program-controlled display are retrieved or are retrievable and/or are automatically transmitted or are transmissible. Furthermore, the processing unit in an example embodiment is configured so that, with respect to the retrieved and/or transmitted data, displays and/or display structures and/or control elements and/or control structures are able to be generated and/or are generated on the human-machine interface having at least one program-controlled display.

According to an example embodiment of the device according to the present invention, at least one part of the data, e.g., functional data of the connected devices and/or applications is stored in a central device (server) of a data communications network, in particular, of the Internet or an intranet, and the processing unit is configured so that these data are retrievable and/or are retrieved and/or are automatically transmissible and/or are transmitted by the processing unit via a communications connection.

Another example embodiment provides that at least one part of the generic data of the display and control environment of the human-machine interface is stored in a central device of a data communications network, for example, of the Internet or an intranet, and the processing unit is configured so that the data are retrievable by the processing unit via a communications connection that may be established and/or are automatically transmissible to the processing unit.

Besides the Internet, any other communications connection may be used as communications connection for retrieving the data or for data transmission, for example, a point-to-point transmission method or a point-to-multipoint method.

An example embodiment of the processing unit provides that the stored data of the display and/or control environment and/or the data of the devices to be displayed and/or to be controlled and/or applications may be updated and/or are updated, and the processing unit is configured so that the required data are retrievable in defined time periods and/or are retrievable and/or are retrieved and/or are automatically transmissible and/or are transmitted event-dependently.

According to another example embodiment of the present invention, the processing unit may also be positioned in one of the connected devices, or may be configured to be a part of the control device of the connected device. However, it may also be provided that some method steps run in one processing unit and the other part of the method steps runs in one or several control units of the connected devices.

The present invention further relates to a computer program product which may be loaded directly into a memory of a processing unit and includes program sections with which the steps of the method according to the present invention may be performed and/or are performed, when the program product is running in the processing unit.

The present invention is further described below on the basis of example embodiments.

DETAILED DESCRIPTION

Figure 1:
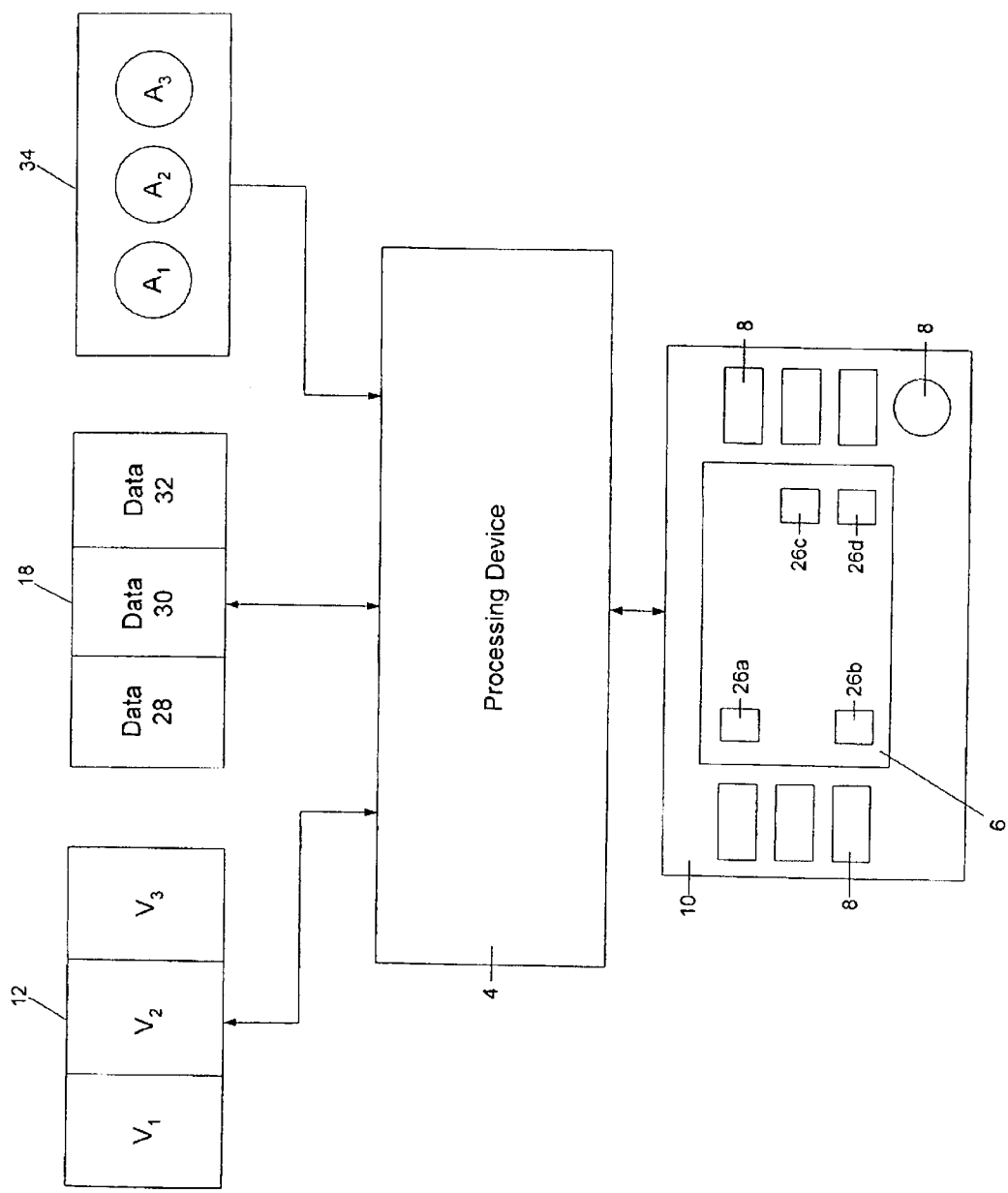
FIG. 1 is a schematic view of a first example embodiment of a device for producing a display and control environment of a human-machine interface.

FIG. 1 is a schematic view of the first example embodiment for a dynamic human-machine interface for a motor vehicle according to the present invention. Human-machine interface 10 includes a display device 6 for representing a display and/or control structure for connected devices and/or applications, such as devices for navigation, audio devices, air conditioning, telephone, the most varied telematics devices, etc. In this connection, the individual devices and also the human-machine interface may be integrated into a data bus system or directly connected to one another. Furthermore, a processing unit 4 or a control unit is assigned directly or indirectly to human-machine interface 10. Possibly, the processing unit may also be configured to perform additional tasks. A memory device is further provided, which includes individual memories or memory sections 12, 18 and 34. First memory section 12 is configured to store environment-specific and/or device-specific and/or customer-specific data, which represent at least vehicle-specific parameters in the example embodiment, such as data which are assigned to a manufacturer, vehicle models, vehicle types, equipment level of the vehicles and/or equipment package, etc. The first memory section may be configured for three sets of data v1, v2, v3, for example. However, it should be understood that the memory section may also be configured for any number of different data sets. In the example embodiment, the data are stored in first memory section 12 according to an XSL standard (eXtensible Stylesheet Language) or a comparable standard. They determine items such as the color or the shape of display images.

Second memory section 18 is provided for storing functional and/or functional group-dependent data 28, 30, 32. In the example embodiment these are the data which define the appearance and/or the function of at least one program-controlled display or applet. For example, these data describe how many control buttons are positioned on the display of a touchscreen display, which functions are assigned to so-called softkeys or whether a list selection is provided. The number of submenus may also be determined by these data. In the example embodiment, different tasks are assigned to data 28, 30, 32. First data 28 represent the generic functional data of human-machine interface 10, second data 30 define the appearance of the program-controlled display or applet and third data 32 represent a target linkage, as described in greater detail below. Second memory section 18 may be configured to store first data 28, data 30 and/or data 32 according to an XML standard (extensible markup language) or a comparable standard.

Processing device 4 is configured, for example, according to an HTML standard. Processing unit 4 retrieves data 28, 30, 32 from second memory section 18, in dependence upon defined inputs, and generates the generic appearance of the human-machine interface in connection with retrieved data—in the example embodiment, vehicle-specific data V1 from first memory section 12. The vehicle-specific data are retrieved in dependence upon the vehicle in which the human-machine interface is to be installed. These data v1 determine, for example, the vehicle-specific design of human-machine interface 10, for example, the form and color of displays or their parts.

Program-controlled display 24 or applet displayed on display area 6 includes 4 command buttons 26a, 26b, 26c, 26d. It should be understood that any suitable number of interface elements may be provided. Each interface element, such as command buttons 26a, 26b, 26c, 26d may correspond to a function previously determined and/or to an established linkage. Thus, in the example embodiment, command buttons 26a, 26b, 26c, 26d correspond to a functional allocation of control elements 8 configured as softkeys. In the case of a display unit configured as a touchscreen, the command buttons themselves may be configured as "control elements". The target linkages or functions of the interface elements are produced with the aid of retrieved data 32. The browser used in the example embodiment is configured according to a DOM standard (document object model).

Processing unit 4 also includes a third memory section 34, which configures the data of the connected devices and/or applications A1, A2, A3. These data include at least the data of a function of the connected devices and/or applications, for example, in the case of a radio, the selection of stored stations. While FIG. 1 illustrates three devices and/or applications A1, A2, A3, it should be understood that any number of devices and/or applications are possible. Furthermore, the data of every single function or every single parameter of the connected devices and/or applications may be stored in the memory section. It may be that data of devices and/or applications, for which the possibility of connection to the human-machine interface is provided, have already been stored. These are then retrieved, for example, at the time of connecting the device or application. The data of connected devices and/or applications A1, A2, A3 are stored in the third memory section in the form of, for example, a JAVA code. Other standards are possible. Retrieved data 34 of the connected devices and/or applications are linked to the retrieved data from first and second memory section 12 and 18 via processing unit 4, and the respective display and control structures for the human-machine interface are generated.

The linkage will be explained as an example, in the context of station selection of the stored stations in a connected radio. The functional and functional group-dependent data 28, 30, 32 represent the number and the arrangement of the command buttons on the display area, as well as their functional assignment, e.g., jump to a next menu level or clearing a function still to be performed. For example, four command buttons may be provided. The form and the appearance of the individual command buttons are defined by the vehicle-specific data from the first memory section, and, via the data of the radio from third memory section 34, a station is assigned to each command button, which may then be selected by using the respective command button.

Each of the individual or several of memory sections 12, 18, 34 may be integrated into a single logical memory device. However, they may also be configured logically independent of one another. Each individual or several of memory sections 12, 18, 34 may be installed in the vehicle, may be, for example, a part of the human-machine interface or may be positioned at a distance from it. In this connection, it is also possible that the human-machine interface is configured before installation in a vehicle with respect to the vehicle, that is, memory sections 12, 18, 34 are not assigned to a single human-machine interface. Updating the retrieved data may then be performed, for example, via a data communications network or in a service station by retrieval from an external memory device.

Figure 2:
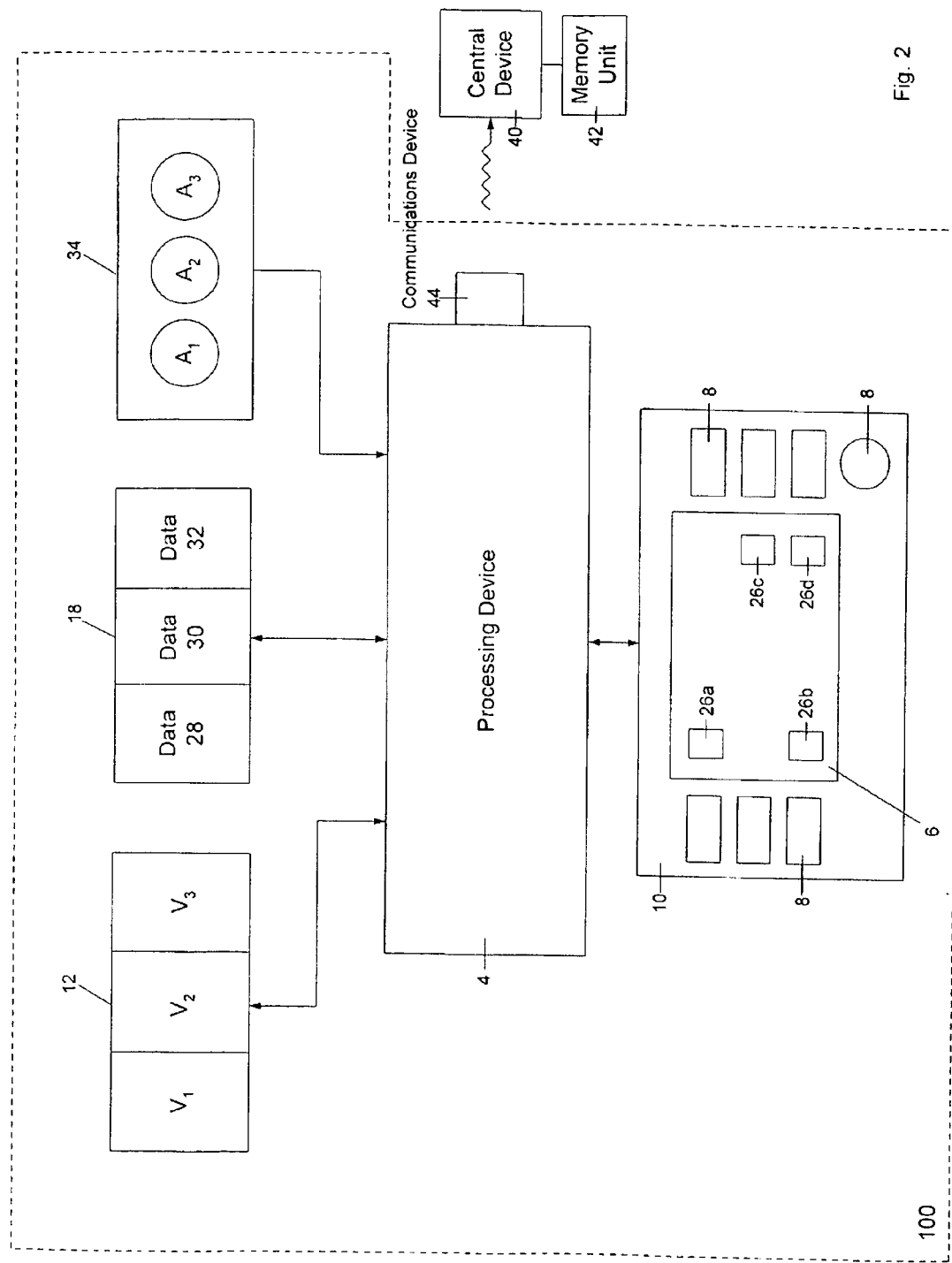
FIG. 2 is a schematic view of a second example embodiment of a device for producing a display and control environment of a human-machine interface.

A further example embodiment is illustrated in FIG. 2. FIG. 2 illustrates identical elements to those illustrated in FIG. 1, denoted by the same reference characters. The device illustrated in FIG. 2 for producing a human-machine interface 10 also includes memory sections 12, 18 and 34, in which, correspondingly, the environment-specific and/or device-specific and/or customer-specific data V1, V2, V3, the functional and/or functional group-dependent data 28, 30, 32 which represent the appearance and the function of the program-controlled representations of human-machine interface 10, and the functional data of the connected and/or still connectible devices and/or applications are stored. These are retrieved by the processing unit, e.g., in dependence upon certain predefined values or parameters, and are linked to one another on display device 6 of the human-machine interface so as to produce the corresponding displays and/or components thereof. These components are represented as being present in vehicle 100. Outside vehicle 100 there is a central device 40 having a memory unit 42, such as a server of a data communications network. Using central device 40, processing unit 4 may perform a data exchange via a communications device 44 assigned to it and a communications line able to be established with the aid of the communications device, and may retrieve data stored in memory device 42. This may be performed continuously when the communications connection is established, but also, for example, at certain time intervals or event-related. Such events may be the starting of the vehicle, connection of new equipment, a time for service or a manual request by an operator. In each case, a communications connection may have to be established between processing device 4 and central device 40. It is also possible to connect memory device 42, e.g., via a control unit in a service station, directly via a data line to processing unit 4.

Memory unit 42 may include both environment-specific and/or device-specific and/or customer-specific data V1, V2, V3, functional and/or functional group-dependent data 28, 30, 32 and data for connected and/or still connectible devices and/or applications, with the aid of which the data in the vehicle may be updated in memory sections 12, 18, 34 when, for example, a device and/or application is to be exchanged, or a new device is to be connected or a new application is to be installed. However, it is also possible that, for example, a part of the data of a connected device or an installed application is stored in memory device 42 and retrieved as required or by automatic retrieval. One example includes data of street maps needed for navigational devices or driver assistance systems. These data may require a great deal of storage and may have a high change rate, so that, by storing these data in an external memory 42, an updated status of the data may be ensured for the vehicle devices.

Even though only two example embodiments of the present invention are disclosed and described herein, these example embodiments do not represent any limitation of the present invention. Other implementation possibilities of the present invention are possible. Furthermore, it should be understood that changes may be made in the present invention without deviation from its purpose or its scope. Thus, memory section 34 may have assigned to it its device-related data A1, A2, A3, for example, of each device to be connected or already connected, that is, the device brings "its memory section" 34 along with it. But a memory section 34, which is physically assigned to the processing unit, may also be there for several devices and/or applications.

One advantage of the present invention is, e.g., that a human-machine interface is created which is adaptable to the most different application cases, which may be updated in a simple manner when data changes occur, by retrieving the new data, linking them with one another, and creating correspondingly adapted display and control structures. In addition, the present invention creates the possibility of connecting additional devices to human-machine interface 10.

What is claimed is:

1. A method for producing a display and control environment of a human-machine interface having one of connected devices, connectible devices and applications, a processing device assigned to the human-machine interface one of directly and indirectly, comprising the steps of:

from stored generic data of at least one of the display and control environment of the human-machine interface, at least one of retrieving a portion of the stored generic data by the processing device unit and transmitting the portion of the stored generic data into the processing device as a function of defined parameters;

at least one of retrieving stored data of at least one of the connected devices, the connectible devices and the applications by the processing device and transmitting stored data of at least one of the connected devices, the connectible devices and the applications to the processing device;

linking the one of the retrieved and transmitted portion of the stored generic data of the at least one of the display and the control environment of the human-machine interface to the at least one of the retrieved and the transmitted data of the at least one of the connected devices, the connectible devices and the applications in the processing device; and generating at least one of display and control structures on the human-machine interface as a function of the linking step.

2. The method according to claim 1, wherein the stored data includes functional data.

3. The method according to claim 1, wherein the portion of the stored generic data of the at least one of the display and the control environment of the human-machine interface include at least one of environment-specific, device-specific and customer-specific data and at least one of functional and functional group-dependent data, the method further comprising the step of combining the at least one of the environment-specific, device-specific and customer-specific data with the at least one of the functional and functional group-dependent data as a function of the defined parameters in the processing device.

4. The method according to claim 3, wherein the at least one of the environment-specific, the device-specific and the customer-specific data includes data regarding an appearance.

5. The method according to claim 4, wherein the data regarding the appearance includes data regarding a color and a form of display images and components thereof.

6. The method according to claim 4, wherein the at least one of the functional and the functional group-dependent data includes data regarding a structural design of display images.

7. The method according to claim 6, wherein the data regarding the structural design of display images includes data regarding at least one of a number and a configuration of the display images, components thereof and linkages thereof.

8. The method according to claim 3, further comprising the steps of:
   at least one of retrieving and transmitting the at least one of the functional and the functional group-dependent data;
   at least one of retrieving and transmitting the at least one of the environment-specific, the device-specific and the customer-specific data corresponding to at least one of the retrieved at least one of the functional and the functional group-dependent data and as a function of defined parameters;
   at least one of retrieving and transmitting the data of the at least one of the connected devices, the connectible devices and the applications;
   linking the at least one of the retrieved and the transmitted data; and
   generating at least one of display and control structures on the human-machine interface as a function of the linking step.

9. The method according to claim 3, wherein the human-machine interface is configured to be installed in a motor vehicle, and wherein the at least one of the environment-specific, the device-specific and the customer-specific data include vehicle-specific parameters.

10. The method according to claim 9, wherein the at least one of the functional and the functional group-dependent data include data relating to at least one of an appearance and at least one function of at least one program-controlled display for each of a plurality of vehicles.

11. The method according to claim 10, wherein the data relating to at least one of the appearance and at least one function includes an applet.

12. The method according to claim 9, wherein the data of at least one of the connected devices, the connectible devices and the applications include data relating to functions of the at least one of the connected devices, the connectible devices and the applications, at least one function corresponding to one program-controlled display.

13. The method according to claim 10, further comprising the steps of:
   at least one of retrieving and transmitting at least necessary data that represents the at least one of the appearance and the function of at least one program-controlled display;
   at least one of retrieving and transmitting at least of the vehicle-specific parameters of the at least one of the environment-specific, the device-specific and the customer-specific data at least one of corresponding to the data of the at least one program-controlled display and as a function of defined parameters;
   at least one of retrieving and transmitting at least the data of the at least one of the connected devices, the connectible devices and the applications corresponding to the at least one program-controlled display; and
   generating at least one of displays and control structures on the human-machine interface having at least one program-controlled display corresponding to the at least one of the retrieved and transmitted data.

14. The method according to claim 1, further comprising the step of storing at least one part of the data in a central device of a data communications network, the at least one part of the data at least one of retrieved by the processing device via a communications connection that is configured to be established and automatically transmitted to the processing device.

15. The method according to claim 14, wherein the at least one part of the data includes functional data of the at least one of the connected devices, the connectible devices and the applications to be one of displayed and controlled.

16. The method according to claim 1, further comprising the step of storing at least one part of the portion of the generic data of the at least one of the display and the control environment of the human-machine interface in a central device of a data communications network, the at least one part of the portion of the generic data at least one of retrieved by the processing device via a communications connection that is configured to be established and transmitted to the processing device.

17. The method according to claim 1, further comprising the step of updating at least one of the generic data of at least one of the display and the control environment of the human-machine interface and the data of the at least one of the connected devices and the applications, wherein at least one of the portion of the generic data of at least one of the display and the control environment of the human-machine interface and the data of the at least one of the connected devices and the applications are at least one of retrievable, and retrieved and transmitted in at least one of defined time periods and in dependence upon defined events.

18. A device for producing at least one of a display and a control environment of a human-machine interface corresponding to at least one of connected devices, connectible devices and applications, the human-machine interface including at least one control device and at least one output device, and the human-machine at least one of connected to a processing device and including the processing device, comprising:

at least one memory device assigned to the processing device configured to store generic data of the at least one of the display and the control environment of the human-machine interface and functional data of the at least one of the the connected devices, the connectible devices and the applications, the processing device configured so that a portion of stored generic data of the at least one of the display and the control environment of the human-machine interface is at least one of retrievable, retrieved, automatically transmissible and automatically transmitted as a function of defined parameters and so that stored functional data of the at least one of the connected devices, the connectible devices and the applications are at least one of retrievable, retrieved, automatically transmissible and automatically transmitted, the at least one of the retrievable, retrieved, automatically transmissible and automatically transmitted portion of generic data of the at least one of the display and the control environment of the human-machine interface at least one of linkable and linked to the at least one of the retrievable, retrieved, automatically transmissible, and automatically transmitted data of the at least one of the connected devices and the applications, the processing device configured so that the at least one of the display and the control structures are at least one of generatable and generated on the human-machine interface in dependence upon the linkage.

19. The device according to claim 18, wherein the generic data include at least one of environment-specific, device-specific and customer-specific data and at least one of functional and functional group-dependent data of the at least one of connectible devices and the applications, and the processing device is configured so that after the at least one of the retrieval and the transmission of data of the at least one of the environment-specific, the device-specific and the customer-specific data and of data of the at least one of the functional and the functional group-dependent data, these data are at least one of combinable and combined in the processing device as a function of defined parameters.

20. The device according to claim 19, wherein at least one of the environment-specific, the device-specific and the customer-specific data includes data relating to an appearance.

21. The device according to claim 20, wherein the data relating to the appearance include data relating to a color and a form of display images and components thereof.

22. The device according to claim 19, wherein the at least one of the functional and the functional group-dependent data includes data relating to a structural design of display images.

23. The device according to claim 22, wherein the data relating to the structural design of display images includes data relating to at least one of a number and a configuration of the display images, components thereof and linkages thereof.

24. The device according to claim 19, wherein the processing device is configured so that the data of the at least one of the functional and the functional group-dependent data are at least one of retrievable, retrieved, automatically transmissible and automatically transmitted to the processing device; and wherein the data of the at least one of the environment-specific, the device-specific and the customer-specific data and the data of the at least one of the connected devices and the applications, are at least one of retrievable, retrieved, transmissible and transmitted at least one of in accordance with the at least one of the retrieved and transmitted at least one of functional and functional group-specific data and as a function of defined parameters; and wherein the at least one of the retrieved and the transmitted data are at least one of linkable and linked with one another; and wherein the at least one of the display and the control structures of the human-machine interface are at least one of generatable and generated in dependence upon the linkage.

25. The device according to claim 19, wherein the device is configured to be installed in a motor vehicle, the at least one of the environment-defined, the device-defined and the customer-defined data include vehicle-defined parameters.

26. The device according to claim 25, wherein the at least one of the functional and the functional group-dependent data include data relating to at least one of an appearance and at least one function of at least one program-controlled display for each of a plurality of vehicles.

27. The device according to claim 26, wherein the data relating to the at least one of the appearance and the at least one function includes an applet.

28. The device according to claim 25, wherein the data of the at least one of the connected devices, the connectible devices and the applications include data relating to functions of the at least one of the connected devices, the connectible devices and the applications, at least one function corresponding to a program-controlled display.

29. The device according to claim 27, wherein the processing device is configured so that the data, which represent the at least one of the appearance and the function of at least one program-controlled display, are at least one of retrievable, retrieved, automatically transmissible and automatically transmitted;

at least the vehicle-defined parameters of the at least one of the environment-defined, device-defined and customer-defined data are at least one of retrievable, retrieved, automatically transmissible and automatically transmitted in accordance with the data of the at least one program-controlled display and as a function of defined parameters;

data of the at least one of the connected devices and the applications are at least one of retrievable, retrieved, automatically transmissible and automatically transmitted in accordance with the program-controlled display; and in accordance with the at least one of the retrieved and transmitted data, at least one of displays, display structures and control structures are at least one of generatable and generated on the human-machine interface using at least one program-controlled display.

30. The device according to claim 18, wherein at least one part of the functional data of the at least one of the connected devices and the applications are stored in a central device of a data communications network and are at least one of retrievable and automatically transmissible by the processing device via a communications connection that is configured to be established.

31. The device according to claim 18, wherein at least one part of the portion of the generic data is stored in a central device of a data communications network and is at least one of retrievable and automatically transmissible by the processing device via a communications connection that is configured to be established.

32. The device according to claim 18, wherein the processing device is configured so that at least one of the portion of the stored generic data of the at least one of the display and control environment and the stored data of the at least one of the device and the applications to be at least one of displayed and controlled are configured to be updated, the data at least one of retrievable, retrieved, automatically transmissible and automatically transmitted in at least one of defined time intervals and in dependence upon defined events.

33. The device according to claim 18, wherein a control device of a connected device is configured so that the control device is arranged to perform at least partial tasks of the processing device.

34. A computer-readable storage medium storing a set of instructions, the set of instructions capable of being executed by a processor arrangement to implement a method for producing a display and control environment of a human-machine interface having one of connected devices and applications, a processing device assigned to the human-machine interface one of directly and indirectly, the method including the steps of:

from stored generic data of at least one of the display and the control environment of the human-machine interface, at least one of retrieving a portion of the stored generic data by the processing device unit and transmitting the portion of the stored generic data into the processing device as a function of defined parameters;

at least one of retrieving stored data of at least one of the connected devices and the applications by the processing device and transmitting stored data of at least one of the connected devices and the applications to the processing device;

linking the one of the retrieved and transmitted portion of the stored generic data of the at least one of the display and the control environment of the human-machine interface to the at least one of the retrieved and the transmitted data of the at least one of the connected devices and the applications in the processing device; and generating at least one of display and control structures on the human-machine interface as a function of the linking step.

35. A method for producing a display and control environment of a human-machine interface comprising the steps of:

retrieving a portion of a stored generic interface data as a function of defined parameters;

retrieving a stored data of at least one of a connected device and an application;

linking the retrieved portion of the stored generic interface data to the retrieved stored data; and generating at least one of display and control structures on the human-machine interface as a function of the linking step.

36. A device for producing a display and control environment of a human-machine interface comprising:

at least one memory device configured to store generic interface data and data of at least one of a connected device and an application; and a processing device coupled to the at least one memory device and configured to retrieve a portion of the stored generic interface data as a function of defined parameters, to retrieve the data of the at least one of a connected device and an application, the retrieved portion of the stored generic interface data linkable to the retrieved data of the at least one of a connected device and an application, and to generate at least one of display and control structures on the human-machine interface in dependence upon the linkage.

* * * * *

UNITED STATES PATENT AND TRADEMARK OFFICE
CERTIFICATE OF CORRECTION

PATENT NO. : 6,775,598 B2
DATED : August 10, 2004
INVENTOR(S) : Carsten Bergmann et al.

It is certified that error appears in the above-identified patent and that said Letters Patent is hereby corrected as shown below:

Column 6,
Line 48, delete "24".

Column 11,
Line 4, change "and the human-machine at least one of" to -- and the human-machine interface at least one of --.
Line 11, change "the the" to -- the --.

Signed and Sealed this

Thirty-first Day of May, 2005

JON W. DUDAS
*Director of the United States Patent and Trademark Office*